July 7, 1936.  W. W. E. WINTER  2,046,988
NONMETALLIC GEAR AND METHOD OF MAKING THE SAME
Filed July 18, 1935  2 Sheets-Sheet 1
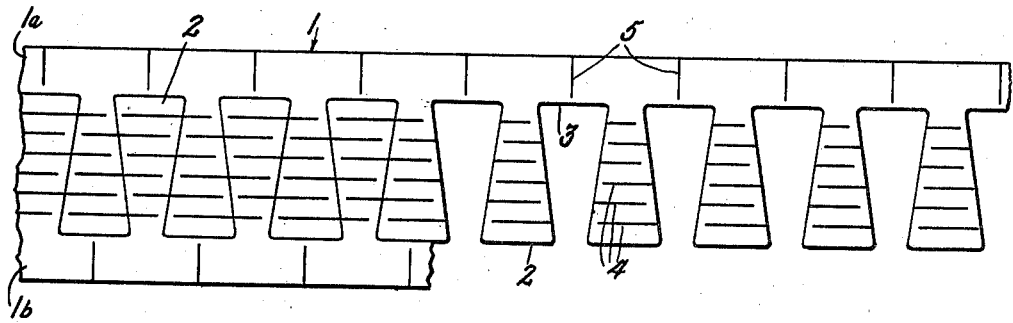
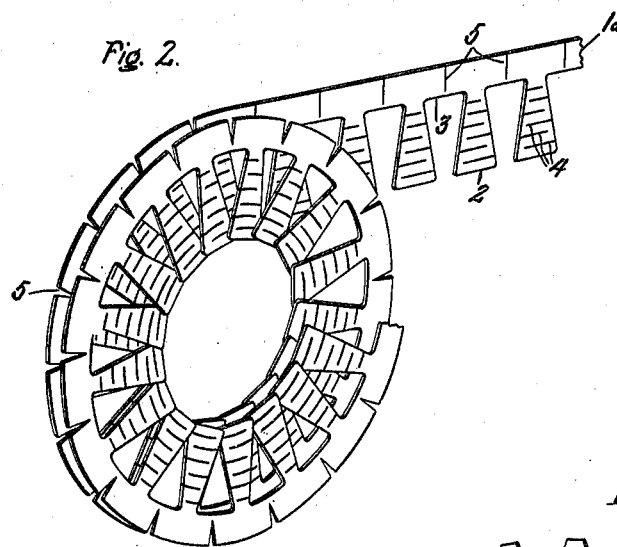
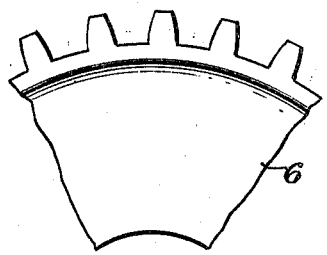
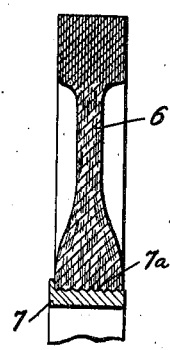
Inventor:
Wilfred W. EisenWinter,
by Harry E. Dunham
His Attorney.

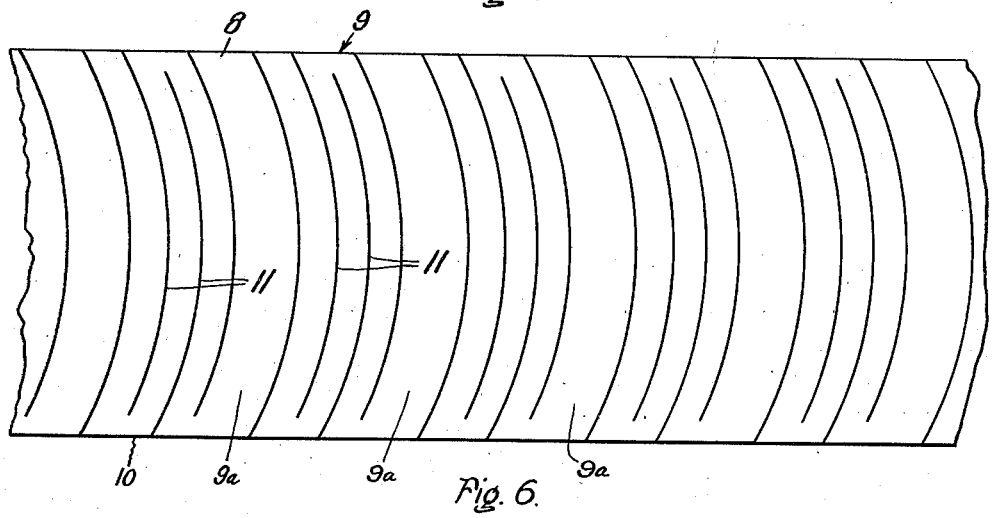
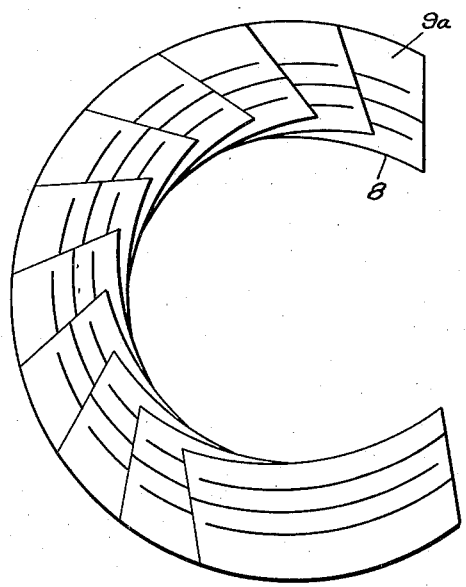
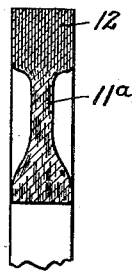
Inventor:
Wilfred W. Eisen Winter,
by Harry E. Dunham
His Attorney.

Patented July 7, 1936

2,046,988

UNITED STATES PATENT OFFICE 2,046,988

NONMETALLIC GEAR AND METHOD OF MAKING THE SAME

Wilfred W. Eisen Winter, Swampscott, Mass., assignor to General Electric Company, a corporation of New York Application July 18, 1935, Serial No. 32,015

20 Claims. (Cl. 154—2)

The present invention relates to laminated non-metallic gear wheels or gear wheel blanks which are formed from sheets of material treated with an adhesive and molded together.

The object of my invention is to provide an improved gear wheel or gear wheel blank and also to provide an improved method for making the same which will reduce the waste material.

For a consideration of what I believe to be novel and my invention, attention is directed to the accompanying description and the claims appended thereto.

In the drawings, Fig. 1 is a fragmentary view of a strip of material showing the manner of forming two strips therefrom which are adapted to be edgewise wound; Fig. 2 is a perspective view of one of the strips of material wound edgewise in the form of a fine pitch helix; Fig. 3 is a fragmentary sectional view of a completed gear wheel blank; Fig. 3a is a fragmentary view of the gear wheel blank shown in Fig. 3 after machining the teeth; Fig. 4 is a fragmentary sectional view of a completed gear wheel blank having a metal hub molded therein; Figs. 5, 6, and 7 show a modification of my invention; Fig. 5 is a fragmentary view of a strip of material showing the manner of cutting segments therefrom; Fig. 6 is a fragmentary view showing the manner of assembling the segments in the form of an annulus; and Fig. 7 is a sectional view of the completed gear wheel blank made according to this modification.

Referring to the drawings, the numeral 1 indicates a strip of sheet material from which the gear wheel blank is formed. This material may be any suitable material such as woven cotton fabric which has been treated with an adhesive such as an uncured phenolic condensation product which hardens into the hard infusible state upon the application of heat and pressure. In the manufacture of the gear blank, the strip 1 is cut, by any suitable tool, as indicated by the solid lines in Fig. 1, to divide the strip longitudinally into two strips 1a and 1b, each having teeth 2 and slots 3 formed along one edge thereof with the teeth of one strip fitting within the slots of the other strip. Staggered cuts 4 are made in the portion of the strip 1 from which the teeth are formed. These cuts extend from a tooth of one of the strips alternately to each of the adjacent teeth of the other strip. When the strips are molded, the staggered relation of the cuts 4 permits the material of the teeth to flow under the application of pressure. This flow permits uniform distribution of the material in the portion of the gear wheel blank occupied by the teeth. By making the cuts 4 before the strips 1a and 1b are separated, the cuts may be more easily made since there is no difficulty in holding the teeth aligned while the cuts are being made. The teeth 2 are of dovetail shape. The width of the teeth 2 increases from the bottom of the slots 3 toward the tip of the teeth. The width of the teeth at the base of the slot 3 is shown as somewhat less than the width of the slot at this point. These dimensions, while subject to variation, are preferably of the same order of magnitude. Along the smooth edge of each of the strips 1a and 1b are cuts 5 which provide increased flexibility so that the strips may be more readily edgewise wound.

In the manufacture of the gear blank, the strips 1a and 1b are separated and each of these strips is wound edgewise in the form of a fine pitch helix with the teeth on the inner side, as indicated by the fragmentary view in Fig. 2. During this winding, the cuts 5 are spread to form V-shaped slots. This tends to prevent wrinkling during the edgewise winding of the strip.

It is important that the teeth be out of alignment so that the material of the teeth may be substantially uniformly distributed throughout the portion of the helix occupied by the teeth. This distribution of the teeth may be obtained by making no effort to maintain alignment of the teeth and thereby securing a random distribution or by deliberate misalignment of the teeth. When a sufficient number of turns of the helix have been wound, the strip is severed and the helix is placed in a mold and heated until plastic under pressure to form a preform of substantially the shape shown in Fig. 3. During this molding, the material in the teeth 2 flows inwardly forming the web of the gear wheel blank, as indicated by the numeral 6 in Fig. 3. The flowing of the material of the teeth equalizes the distribution of the material on the web. Due to the smaller amount of material in the web portion and also to the flowing of this material under pressure, the web is thinner than the rim which is formed from the smooth edge of the strip. This thinning of the web section is advantageous since a thick section in the web is not needed for mechanical strength and it is desirable that the amount of material be kept to a minimum. The wide tips of the teeth 2 provide sufficient material so that the web is of increased thickness at the center. This permits the gear to be more readily mounted on a shaft. After this molding, the preform is removed and placed in another mold of slightly greater diameter and cured under heat and pressure to form the completed gear wheel blank. Subsequently, the gear wheel blank may be subjected to further curing and annealing. At the end of this, the gear wheel blank is ready for machining as required. Fig. 3a is a fragmentary view of the gear wheel blank after machining the teeth.

One of the advantages of gear wheel blanks which are constructed in this manner is that the amount of material in the gear wheel blank can be very easily determined. The gear wheel blanks are therefore uniform and require less material. Also, the relative amount of material in the web and rim is fixed, defects which result from using different material in the web and rim are eliminated, and the cross section of the web is such that a minimum of material is required.

The relative thickness of the web portion of the gear wheel blank is controlled by the width of the teeth 2 at the bottom of the slots 3. If the teeth are made narrower at this point, the web will be thinner and if the teeth are made wider at this point, the web will be thicker. By making the teeth widest at the bottom of the slots, the web may be made to equal the rim in thickness.

Fig. 4 is a fragmentary section of a gear wheel blank which is identical with that shown in Fig. 3, except that it has a metal hub 7 which is molded to the web at the center. The manufacture of this gear wheel blank is the same as that of the gear wheel blank shown in Fig. 3, except that the hub 7 is inserted within the first mold before applying heat and pressure to form the preform. The hub 7 may be provided with a knurled surface 7a in order to provide a better bond between the hub and the blank.

In the modification of my invention shown in Figs. 5, 6, and 7, the laminations 8 from which the gear wheel blanks are made are cut in the form of arcuate segments from a strip 9 of suitable material. These segments comprise a rim portion 9a and a web portion 10. The web portion has staggered cuts 11 therein which extend alternately from each side of the segments. The cuts 11 permit the material in the web portion of the segments to flow under pressure to equalize the distribution of material. In the manufacture of the gear blank, the segments are stacked in the form of an annulus, as indicated by the fragmentary view in Fig. 6. Each segment overlaps the preceding segment so that the joints between adjacent segments are staggered. When a sufficient number of segments have been stacked, the annulus is placed in a mold and molded into a preform having the approximate section shown in Fig. 7, by heating the annulus until the laminations become plastic and applying pressure. During this molding operation, the material in the web portion of the segments flows inwardly and forms a web 11a which is thinner in section than the rim 12 of the gear wheel blank. At the center of the web, the section is thicker so that the gear wheel may be more readily attached to a shaft. After forming the preform, the completed gear wheel blank is made by further molding and curing in the manner described in connection with the gear wheel blank shown in Fig. 3.

By using a different mold the web may be made to equal the rim thickness. In this case, due to the greater amount of material at the center, the material at the center will flow outward to equalize the distribution of material.

What I claim as new and desire to secure by Letters Patent of the United States, is:

1. A non-metallic laminated gear wheel or gear wheel blank comprising sheets of material treated with an adhesive and molded together, said sheets having a rim portion and a web portion extending radially inward from said rim portion, said web portions having cuts therein whereby the material may flow under pressure to form the web of the gear wheel.

2. A non-metallic laminated gear wheel or gear wheel blank comprising sheets of material treated with an adhesive and molded together, said sheets having a rim portion and a web portion extending radially inward from said rim portion, said web portions having spaced cuts therein arranged in staggered relation whereby the material of the radially extending portions may flow under pressure to form the web of the gear wheel.

3. A non-metallic laminated gear wheel or gear wheel blank comprising sheets of material treated with an adhesive and molded together, said sheets having a rim portion and teeth extending radially inward therefrom, said teeth having cuts therein arranged in staggered relation whereby the material of the teeth may flow under pressure to form the web of the gear wheel.

4. A non-metallic laminated gear wheel or gear wheel blank comprising sheets of material treated with an adhesive and molded together, said sheets having a rim portion and teeth extending radially inward therefrom, said teeth having cuts therein extending alternately from each side thereof whereby the material of the teeth may flow under pressure to form the web of the gear wheel.

5. A non-metallic laminated gear wheel or gear wheel blank comprising sheets of material treated with an adhesive and molded together, said sheets having a rim portion and teeth extending radially inward therefrom for forming the web of the gear wheel, the width of said teeth at said rim portion being of the same order as the space between the teeth.

6. A non-metallic laminated gear wheel or gear wheel blank comprising sheets of material treated with an adhesive and molded together, said sheets having a rim portion and teeth extending radially inward therefrom, said teeth increasing in width from said rim portion.

7. A non-metallic laminated gear wheel or gear wheel blank comprising sheets of material treated with an adhesive and molded together, said sheets comprising segments arranged in the form of an annulus and having cuts in the inner portion thereof whereby the material may flow under pressure to form the web of the gear wheel.

8. A non-metallic laminated gear wheel or gear wheel blank comprising sheets of material treated with an adhesive and molded together, said sheets comprising segments arranged in the form of an annulus and having staggered cuts in the inner portion thereof whereby the material may flow under pressure to form the web of the gear wheel.

9. A non-metallic laminated gear wheel or gear wheel blank comprising sheets of material treated with an adhesive and molded together, said sheets comprising segments arranged in the form of an annulus and having staggered cuts in the inner portion thereof extending alternately from each side of the segments whereby the material may flow under pressure to form the web of the gear wheel.

10. The method of forming a non-metallic laminated gear wheel blank which comprises forming sheets of material having a rim portion and a web portion extending radially inward from the rim portion and provided with cuts whereby the material of the web portion may flow under pressure to form the web of the gear wheel blank, stacking said sheets in the form of an annulus, and applying pressure to form the gear wheel blank.

11. The method of forming a non-metallic laminated gear wheel blank which comprises forming sheets of material having a rim portion and a web portion extending radially inward from the rim portion and provided with spaced cuts arranged in staggered relation whereby the material of the rim portion may flow under pressure to form the web of the gear wheel blank, stacking said sheets in the form of an annulus, and applying pressure to form the gear wheel blank.

12. The method of forming a non-metallic laminated gear wheel blank which comprises forming teeth and slots along one edge of a strip of material, said teeth being provided with cuts arranged in staggered relation whereby the material of the teeth may flow under pressure, winding said strip edgewise in the form of a fine pitch helix with the teeth on the inner side, and applying pressure to the helix to form the gear wheel blank.

13. The method of forming a non-metallic laminated gear wheel blank which comprises forming teeth and slots along one edge of a strip of material, said teeth having cuts therein extending alternately from each side thereof whereby the material of the teeth may flow under pressure, winding said strip edgewise in the form of a fine pitch helix with the teeth on the inner side, and applying pressure to the helix to form the gear wheel blank.

14. A lamination for use in the manufacture of laminated gear wheels which comprises a strip having teeth and slots along one edge, the teeth increasing in width from the bottom of the slots.

15. The method of forming a non-metallic laminated gear wheel blank which comprises forming teeth and slots along one edge of a strip of material, said teeth increasing in width from the bottom of the slots, winding said strip edgewise in the form of a fine pitch helix with the teeth on the inner side, and applying pressure to the helix to form the gear wheel blank.

16. The method of forming a non-metallic laminated gear wheel blank which comprises cutting a strip of sheet material so as to divide the strip longitudinally into two strips each having teeth and slots along the inner edge with the teeth of one strip extending with the slots of the other strip and providing cuts extending from a tooth of one strip to an adjacent tooth of the other strip, separating the strips and winding each strip edgewise in the form of a fine pitch helix with the teeth on the inner side, and applying pressure to the helix to form the gear wheel blank.

17. The method of forming a non-metallic laminated gear wheel blank which comprises cutting a strip of sheet material so as to divide the strip longitudinally into two strips each having teeth and slots along the inner edge with the teeth of one strip extending with the slots of the other strip and providing staggered cuts extending from a tooth of one strip alternately to each of the adjacent teeth of the other strip, separating the strips and winding each strip edgewise in the form of a fine pitch helix with the teeth on the inner side, and applying pressure to the helix to form the gear wheel blank.

18. The method of forming a non-metallic laminated gear wheel blank which comprises forming segments of sheet material provided with cuts at the inner portion thereof whereby the material may flow under pressure, stacking said segments in the form of an annulus, and applying pressure to the annulus to form the gear wheel blank.

19. The method of forming a non-metallic laminated gear wheel blank which comprises forming segments of sheet material provided with staggered cuts at the inner portion thereof whereby the material may flow under pressure, stacking said segments in the form of an annulus, and applying pressure to the annulus to form the gear wheel blank.

20. The method of forming a non-metallic laminated gear wheel blank which comprises forming segments of sheet material provided with staggered cuts at the inner portion thereof extending alternately from each edge of the segments whereby the material may flow under pressure, stacking said segments in the form of an annulus, and applying pressure to the annulus to form the gear wheel blank.

WILFRED W. EISEN WINTER.